(12) United States Patent
Park et al.

(10) Patent No.: US 7,844,189 B2
(45) Date of Patent: Nov. 30, 2010

(54) PHASE CONTROLLABLE OPTICAL DELAY INTERFEROMETER, OPTICAL DIFFERENTIAL PHASE SHIFT KEYING DEMODULATOR USING THE SAME, AND DEMODULATING METHOD THEREFOR

(75) Inventors: Chang-Soo Park, Seoul (KR);
Tae-Young Kim, Seoul (KR); Masanori Hanawa, Yamanashi (JP); Sun-Jong Kim, Gwangju (KR); Swook Hann, Gwangju (KR); Won-Taek Han, Gwangju (KR)

(73) Assignee: Gwangju Institute of Science & Technology, Gwangju (KR)

( * ) Notice: Subject to any disclaimer, the term of this patent is extended or adjusted under 35 U.S.C. 154(b) by 934 days.

(21) Appl. No.: 11/564,291

(22) Filed: Nov. 29, 2006

(65) Prior Publication Data
US 2007/0122160 A1 May 31, 2007

(30) Foreign Application Priority Data
Nov. 30, 2005 (KR) ............ 10-2005-0115415

(51) Int. Cl.
*H04B 10/06* (2006.01)
*G02F 2/00* (2006.01)
(52) U.S. Cl. ............ 398/202; 359/325; 398/212; 398/214; 398/188
(58) Field of Classification Search ............. 398/398, 398/188, 202–214; 385/16–42
See application file for complete search history.

(56) References Cited

U.S. PATENT DOCUMENTS

| 5,703,975 | A  | * | 12/1997 | Miller et al. | ............ 385/16 |
| 6,834,146 | B2 | * | 12/2004 | Rockwell et al. | ............ 385/42 |
| 6,836,621 | B1 | * | 12/2004 | Bendelli | ............ 398/83 |
| 7,039,260 | B2 |   | 5/2006 | Nishiki et al. | |
| 2003/0161581 | A1 | * | 8/2003 | Nishiki et al. | ............ 385/37 |
| 2003/0235368 | A1 | * | 12/2003 | Kulishov et al. | ............ 385/40 |
| 2005/0053329 | A1 | * | 3/2005 | Shahar | ............ 385/27 |
| 2005/0141716 | A1 | * | 6/2005 | Kumar et al. | ............ 380/255 |
| 2006/0056845 | A1 | * | 3/2006 | Parsons et al. | ............ 398/41 |

OTHER PUBLICATIONS

Bosco et al: "The Impact of Receiver Imperfections on the Performance of Optical Direct-Detection DPSK", J. of Lightwave Technology, vol. 23, No. 2, Feb. 2005, pp. 842-848.*
Chow C.W. and Tsang H.K., "Polarization-independent DPSK demodulation using a birefringent fiber loop," *IEEE Photon. Technol. Lett.*, vol. 17, No. 6, pp. 1313-1315, Jun. 2005.
Ciaramella E., et al., "A novel scheme to detect optical DPSK signals," *IEEE Photon. Technol. Lett.*, vol. 16, No. 9, pp. 2138-2140, Sep. 2004.

(Continued)

*Primary Examiner*—Li Liu (57) ABSTRACT

An optical DPSK signal demodulator includes a signal separator that separates an optical signal into an input optical signal and an output optical signal in a signal optical path. First and second reflectors are provided at a predetermined interval and reflect the optical signals with a predetermined time delay to have substantially the same intensity. A phase shifter is provided between the first and second reflectors and configured to allow the optical signals reflected from the first and second reflectors to have a phase difference.

20 Claims, 5 Drawing Sheets

OTHER PUBLICATIONS

Davis M.K., "Thermal effects in doped fibers," *J. Lightw. Technol.*, vol. 16, No. 6, pp. 1013-1023, Jun. 1998.

Digonnet M.J.F., "Resonantly enhanced nonlinearity in doped fibers for low-power all-optical switching: A review," *Opt. Fiber Technol.*, vol. 3, No. 1, pp. 44-64, 1997.

Goldstein E. L., "Scaling limitations in transparent optical networks due to low-level crosstalk," *IEEE Photon. Technol. Lett.*, vol. 7, No. 1, pp. 93-94, Jan. 1995.

Janos M. and Eskildsen L., "Low power nonlinear response of $Yb^{3+}$-doped optical fiber Bragg gratings," *Electron. Lett.*, vol. 33, No. 25, pp. 2150-2151, 1997.

Lai Y., et al., "Optically tunable fiber grating transmission filters," *Opt. Lett.*, vol. 28, No. 24, pp. 2446-2448, 2003.

Lyubomirsky I. and Chien C.C., "DPSK demodulator based on optical discriminator filter," *IEEE Photon. Technol. Lett.*, vol. 17, No. 2, pp. 492-494, Feb. 2005.

Rohde M., et al., "Robustness of DPSK direct detection transmission format in standard fiber WDM systems," *Electron. Lett.*, vol. 36, No. 17, pp. 1483-1484, 2000.

Swanson E., et al., "High sensitivity optically preamplified direct detection DPSK receiver with active delay-line stabilization," *IEEE Photon. Technol. Lett.*, vol. 6, No. 2, pp. 263-265, Feb. 1994.

Xie C., et al., "Comparison of system tolerance to polarization-mode dispersion between different modulation formats," *IEEE Photon. Technol. Lett.*, vol. 15, No. 8, pp. 1168-1170, Aug. 2003.

\* cited by examiner

PHASE CONTROLLABLE OPTICAL DELAY INTERFEROMETER, OPTICAL DIFFERENTIAL PHASE SHIFT KEYING DEMODULATOR USING THE SAME, AND DEMODULATING METHOD THEREFOR

BACKGROUND OF THE INVENTION

The present invention relates to a phase controllable optical delay interferometer, an optical differential phase shift keying (DPSK) demodulator using the same, and a demodulating method therefore. More particularly, the invention relates to an optical delay interferometer that couples delayed optical signals having different phases using a fiber grating such as an FBG (fiber Bragg grating) or an LPG (long period fiber grating) and a phase controller, an optical DPSK demodulator using the same, and a demodulating method therefore.

An ODI (optical delay interferometer) has been developed for a variety of applications including a multi-wavelength laser, an optical sensor system, and a demodulator for an optical differential phase shift keyed (hereinafter, referred to as optical DPSK) signal. In general, the ODI has been realized by an imbalanced MZI (Mach-Zehnder interferometer) with one bit time delay in one arm or an AMI (Asymmetric Michelson Interferometer). However, the MZI is intrinsically sensitive to environmental perturbations such as temperature, or acoustic interference, thus demanding an additional circuit for compensating them, and has a difficulty in precisely implementing the delayed amount. Further, the AMI is sensitive to the environmental perturbations and has a power loss of 3 dB.

As widely known, the modulation method for the optical communication system uses an intensity modulation method that has a simple structure, instead of a phase shifting method, which is different from the mobile communication using a wireless network. The phase shift keying method for optical communication is less sensitive to the nonlinearities and the dispersion. Accordingly, the phase shift keying method is suitable to transmit high speed signal through an optical fiber due to its inherently characteristic. However, it is difficult to maintain the phase of the optical signal while passing through the optical fiber, and the receiving device for detecting the phase shift is very complicated. Therefore, there are some problems to use the phase shift keying method.

However, the optical DPSK has recently attracted much attention as a suitable modulation format for long-haul high-speed transmission systems since it also has high tolerance to fiber nonlinearities and polarization mode dispersion during transmission. One of main components of the optical communication system using the above optical DPSK method is a demodulator disposed prior to the optical detector that converts the optical DPSK signal into an intensity signal.

The demodulator for an optical DPSK signal delays half an incident optical signal with one bit time delay, and converts an input DPSK signal into an intensity modulated signal on the basis of the phase difference between a delayed signal and non-delayed signal to output a converted signal. Therefore, in order to convert the optical DPSK signal into the intensity modulated signal without any distortion, additional phase shift other than an inherent phase difference of 0° or 180° ($\pi$) between two optical DPSK signals that propagate through the demodulator, that is, delayed signal and non-delayed signal should be not occurred. Further, the environmental fluctuations such as vibration or temperature changing should not influence the phase difference between the two optical DPSK signals.

The demodulator for optical DPSK signal according to the related art mainly uses the Mach-Zehnder interferometer having one-bit delay line. This demodulator includes optical elements for combining and dividing the light intensity into 3 dB, and one bit delayed light path and non-delayed light path that are displaced between the two optical elements.

However, when using the above demodulator, the delayed optical signal and the non-delayed optical signal pass through different optical paths, and the optical paths individually response to the external perturbations such as vibration or temperature changing. Therefore, it is difficult to precisely make the phase difference of the demodulator be 0° (when the phase difference is 0°, the demodulated signal has an inverted shape of the original signal. The original signal can be easily returned by the inverse detection of the receiver.) or 180° ($\pi$). As a result, it is difficult to perfectly convert the optical DPSK signal into an intensity modulated signal. In detail, since the demodulator according to the related art is sensitive to the external perturbations, the demodulator using the Mach-Zehnder interferometer requires to provide an additional circuit for compensating the external perturbations, which makes the system be complex. Further, since the optical signals pass through different optical paths, the optical signals are sensitive to the polarization due to the different refractive indices of the different optical paths. Further, since the one-bit delay line is implemented by the length difference between the two optical paths, the delay line may have the minute length error, which decreases the yield.

In order to solve the problem of the insensitivity to the external perturbations, another demodulating method is suggested to convert the DPSK signal into a polarization shift keying signal by using one optical high birefringence fiber and then re-convert the polarization shift keying signal into an intensity modulated signal using a polarizer. According to the demodulating method, one bit time delay is implemented by a time delay due to the birefringence. This demodulating method is not sensitive to the external perturbations because of using a single optical fiber. However, according to the above demodulating method, since the polarization axis of the input signal is always set to 45° with respect to optical high birefringence fiber, it is difficult to use the method in a common system that has a random polarization axis. Further, since the phase of the delayed optical signal is not changed, it is difficult to demodulate the different optical DPSK signal, and compensate the lowered performance of the system due to the change in the center wavelength of the input optical signal.

SUMMARY OF THE INVENTION

Accordingly, an embodiment of the present invention provides an optical delay interferometer that couples optical signals delayed by using a fiber grating and a phase control unit and has phase shift.

It is another embodiment of the present invention provides a demodulator that arranges two reflectors or optical mode changing unit in an optical path to divide the optical signal into two optical signals, and delays one of the divided signals and changes the phase the delayed signal to demodulate the optical DPSK signal into the intensity modulated signal.

It is still another embodiment of the present invention provides a demodulating method that divides the incident DPSK signal using two reflectors or optical mode changing unit that are arranged in an optical path, and delays one of the divided signals and changes the phase the delayed signal to demodulate the optical DPSK signal into the intensity modulated signal.

According to an aspect of the invention, an optical DPSK signal demodulator may include a signal separator that separates an optical signal into an input optical signal and an output optical signal in a signal optical path; first and second reflectors that are arranged with a predetermined interval and reflect the optical signals with a predetermined time delay to have the same intensity; and a phase shifter that is disposed between the first and second reflectors and allows the optical signals reflected from the first and second reflectors to have a phase difference of 0° or 180°.

According to another aspect of the invention, an optical DPSK signal demodulator may include a signal separator that separates an optical signal into an input optical signal and an output optical signal; first and second reflectors that are arranged with a predetermined interval and reflect the optical signals with a predetermined time delay to have the same intensity; and a phase control unit that is disposed between the first and second reflectors, allows the optical signals reflected from the first and second reflectors to have a phase difference of 0° or 180°, and compensates the phase change of the demodulator.

According to still another aspect of the invention, an optical DPSK signal demodulator using a differential detecting method may include a signal divider that divides an optical DPSK signal to have the same size; a signal separator that separates an optical signal into an input optical signal and an output optical signal; two pairs of first and second reflectors that are arranged with a predetermined interval and reflect the optical signals with a predetermined time delay to have the same intensity, the two pairs being arranged parallel to each other; and a phase shifter that is disposed between one pair of the pairs of the first and second reflectors, and allows the optical signals reflected from the first and second reflectors to have a phase difference of 0° or 180°.

According to still another aspect of the invention, an optical DPSK signal demodulator using a differential detecting method may include a signal divider that divides an optical DPSK signal to have the same size; a signal separator that separates an optical signal into an input optical signal and an output optical signal; two pairs of first and second reflectors that are arranged with a predetermined interval and reflect the optical signals with a predetermined time delay to have the same intensity, the two pairs being arranged parallel to each other; and a phase control unit that is disposed between one pair of the pairs of the first and second reflectors, allows the optical signals reflected from the first and second reflectors to have a phase difference of 0° or 180°, and compensates the phase change of the demodulator.

According to still another aspect of the invention, an optical DPSK signal demodulator may include a first long period grating that divides an optical signal input in a single optical path into a cladding mode signal and a core mode signal to propagate the divided signals; a second long period grating that couples the divided cladding mode signal and core mode signal; and a phase shifter that allows the phase difference between the cladding mode signal and the core mode signal to be 180° or 0°.

According to still another aspect of the invention, a method of demodulating an optical DPSK signal may include primarily reflecting a part of input optical signal; secondarily reflecting the rest of the input optical signal with the same intensity as in the primarily reflecting; shifting a phase of the secondarily reflected optical signal to be 180° or 0° different from the primarily reflected optical signal; and coupling the primarily reflected optical signal and the secondarily reflected optical signal to output the coupled signals.

According to still another aspect of the invention, a method of demodulating an optical DPSK signal may include dividing an optical signal that is input in a single mode into a cladding mode signal and a core mode signal; shifting the phase of the cladding mode signal to be 180° or 0° different from the core mode signal; and coupling the cladding mode signal and the core mode signal to output the coupled signals.

Further, this invention provides an optical delay interferometer having a phase controllable function that is capable of dividing and reflecting the input optical signal with a time delay, or allowing the divided optical signals to be propagate, coupling the signals, and then changing the phase of a part of the divided optical signal.

DESCRIPTION OF SPECIFIC EMBODIMENTS

Figure 1:
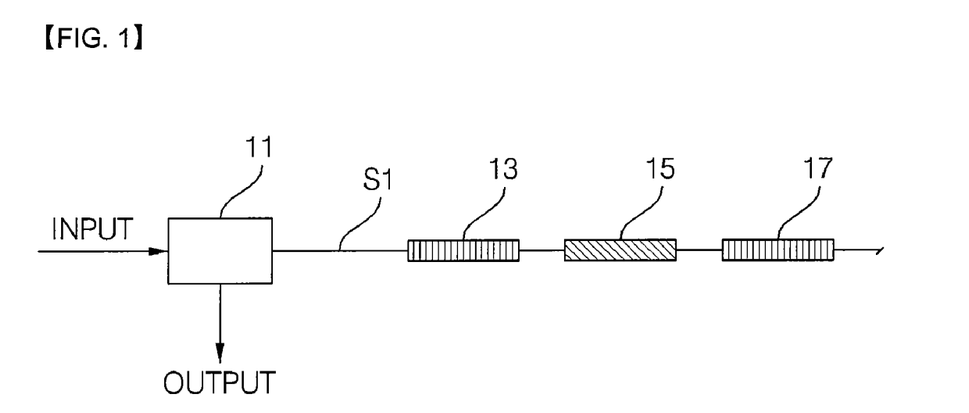
FIG. 1 is a block diagram of an optical DPSK signal demodulator using a phase controllable optical delay interferometer according to a first embodiment of the invention.

FIG. 1 is a block diagram of an optical DPSK signal demodulator using a phase controllable optical delay interferometer according to an embodiment of the invention.

A phase controllable optical delay interferometer according to an embodiment of the invention includes a signal separator 11, first and second translucent reflectors 13 and 17, a phase shifter 15 that is disposed between the two reflectors 13 and 17 and changes a phase of an optical signal reflected from the second reflector 17. When the above phase controllable optical delay interferometer is used for an optical DPSK demodulator, the phase shifter 15 changes the phase of the optical signal reflected from the second reflector 17 by 0° or 180°. Hereinafter, a configuration for serving as a demodulator will be described.

The signal separator 11 divides an input optical signal or an output optical signal in one optical path similar to as an optical circulator, or a optical coupler. The signal separator 11 receives an optical DPSK signal (not shown) to transmit to the first and second reflectors 13 and 17 through an optical path S1. In this case, the optical path S1 refers to a medium through which light can progress.

The optical DPSK signal that progresses through the optical path S1 is transferred to the first and second translucent reflectors 13 and 17. A part of the optical signal is reflected by the first reflector 13 and the rest of the optical signal is reflected by the second reflector 17. In this case, a time delay can occur due to the interval between the first and second reflectors 13 and 17. The phase of the reflected signal from the second reflector 17 is shifted by the phase shifter 15. When the phase controllable optical delay interferometer functions as a demodulator, the phase shifter 15 allows the phase difference between the reflected signals from the first and second reflectors 13 and 17 to be 0° or 180°. Thereafter, the optical signals reflected from the first and second reflectors 13 and 17 are coupled at an output terminal of the signal separator 11 so that the optical DPSK signal is modulated into an intensity modulated optical signal.

The reflectors 13 and 17 are preferably formed of a translucent material, and are formed by one or a combination of two or more of a Bragg grating, a thin film coating, and a reflectively coated dielectric. The reflectors 13 and 17 are arranged with an interval so that the time delay of the two optical signals reflected from the reflectors 13 and 17 is one bit.

In this case, if the intensities of the optical signals reflected from the two reflectors 13 and 17 are equal to each other, the DPSK demodulator can function as an optical time delay interferometer and a demodulator. In order to reflect the optical signals with the same intensity, the reflectivities of the reflectors should satisfy the following equation.

$$R_1 = R_2 \times (1-R_1)^2 \quad (1)$$

In Equation 1, $R_1$ is a reflectivity of the first reflector 13 and $R_2$ is a reflectivity of the second reflector 17.

The phase shifter 15 that is disposed between the first and second reflectors 13 and 17 changes a refractive index of the optical path to change the phase of the delayed optical signal by an amount of the phase shift. Accordingly, the DPSK demodulator can demodulate the optical DPSK signal. The phase shifter 15 is implemented by changing a refractive index of a part of the optical path between the two reflectors 13 and 17. The method of implementing the phase shifter 15 includes a method of irradiating UV light into a fiber when the optical path is realized by the fiber to change the refractive index of the irradiated part, a method of applying a predetermined amount of pressure onto the fiber between the two reflectors 13 and 17 to change the refractive index, and a method of adding a material for increasing the refractive index between the two reflectors when the optical path is realized by an optical waveguide.

In this case, the delay time $\Delta t$ of the optical signal reflected by the second reflector 17 is calculated by the following equation 2. In this case, the interval between the two reflectors 13 and 17 can be controlled to obtain a delay time of one bit.

$$\Delta t = 2 \times \frac{(n_1 \times L_1 + n_2 \times L_2)}{c} \quad (2)$$

In Equation 2, $n_1$ and $L_1$ are a refractive index and a total length of the first and second reflectors, $n_2$ and $L_2$ are a refractive index and a length of the optical path formed between the first and second reflectors 13 and 17, and c is a velocity of light in vacuum.

The DPSK signals reflected from the two reflectors 13 and 17 are modulated into an intensity modulated signals that can be received at the output terminal of the signal separator 11 by a light receiver (now shown).

Figure 2:
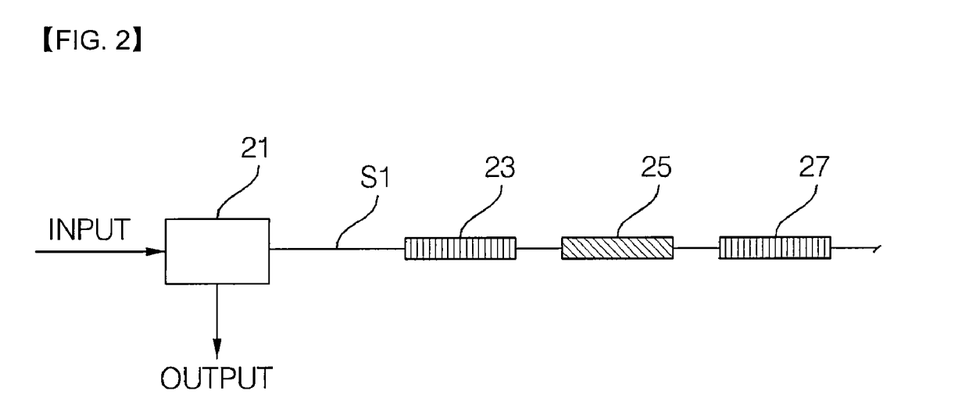
FIG. 2 is a block diagram of an optical DPSK signal demodulator having a phase controllable function according to a second embodiment of the invention.

FIG. 2 is a block diagram of an optical DPSK signal demodulator having a phase controllable function according to a second embodiment of the invention.

The DPSK demodulator having a phase controllable function according to the second embodiment includes a signal separator 21, first and second reflectors 23 and 27 having a predetermined reflectivity, a phase control unit 25 that is disposed between the two reflectors 23 and 27 and maintains the phase difference between the optical signals reflected from the two reflectors 23 and 27 to be 0° or 180°.

The construction and function of the signal separator 21, the reflectors 23 and 27, and an optical path S1 are the same as FIG. 1, only the phase control unit 25 will be described in detail.

The phase control unit 25 disposed between the two reflectors 23 and 27 changes the phase of the optical signals to continuously compensate the phase transition of the demodulator due to the change in the center wavelength of the optical signal. By maintaining the phase difference between the two reflected signals to be 0° or 180°, it is possible to demodulate the optical DPSK signal.

The phase control unit 25 changes the refractive index. The change of the refractive index that is performed by the phase shifter is performed as follows. One method is that the optical path between the first and second reflectors 23 and 27 is heated by using a nichrome wire or a TEC to change the refractive index, and another method is that a nonlinear material is added to the optical path between the first and second reflectors 23 and 27 to increase the nonlinearity of the optical path and then change the refractive index of a portion to which the nonlinear material is added. In this case, the nonlinear material may be formed of one or a combination of two or more materials of an absorbent element such as a rare-earth element ($Yb^{3+}$, $Tm^{3+}$, etc.) or an element that increases the nonlinearity by applying an electric field, such as $LiNbO_3$, etc. In this case, when using the nonlinear material, even though the cost is more expensive than when using the heat, the phase control unit 25 can function at high speed. Therefore, if the phase shifter is needed to function at high speed, the method of changing the refractive index by increasing the nonlinearity is preferable.

Figure 3:
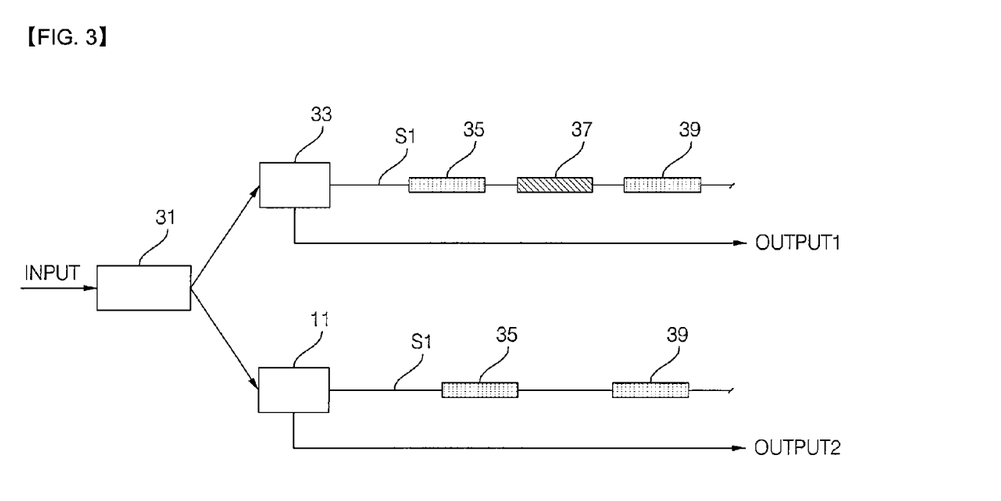
FIG. 3 is a block diagram of an optical DPSK signal demodulator that differentially detects an optical DPSK signal using two light receivers according to a third embodiment of the invention.

FIG. 3 is a block diagram of an optical DPSK signal demodulator that differentially detects an optical DPSK signal using two light receivers according to a third embodiment of the invention. Even though the differentially detecting method is more expensive than the method of the related art, the performance is improved by twice as much. Therefore, this method is preferable in a system that gives more priority to the performance than to the cost.

The optical DPSK signal demodulator according to the third embodiment is configured by a signal divider 31 and at least two demodulators. One of the demodulators includes a signal separator 33, two reflectors 35 and 39 having a predetermined reflectivity, and a phase shifter 37 disposed between the two reflectors 35 and 39. The other demodulator does not include the phase shifter.

The signal divider 31 divides the optical DPSK signal so as to have the same size and then transmits the divided signals to the signal separators 33. As shown in FIG. 1, the functions of the signal separators 33, the reflectors 35 and 39, and the phase shifter 37 are substantially the same as the signal separator 11, the reflector 17, and the phase shifter 15 shown in FIG. 1.

According to the above configuration, as shown in FIG. 3, one of the demodulators includes the phase shifter 37 but the other demodulator does not include the phase shifter. Therefore, in the demodulator that includes the phase shifter 37, the phase difference between the optical signal reflected from the second reflector 39 and the optical signal reflected from the first reflector 35 is 180°, in the other demodulator that does not include the phase shifter 37, the phase difference is 0°. Therefore, a first output OUTPUT 1 and a second output OUTPUT 2 that are coupled to each other in each of the signal separators 33 can be utilized as a signal for optical DPSK system that uses the differential detecting method. That is, the first and second outputs are demodulated into two intensity modulated signals that can be differentially detected at the output terminal by using the two optical receivers (not shown) and transmitted.

Further, according to the third embodiment, the two demodulators are connected in parallel to each other. Therefore, it is considered that each of the demodulators use one optical path, and the insensitivity is the same as the embodiments shown in FIG. 1 and FIG. 2.

Figure 4:
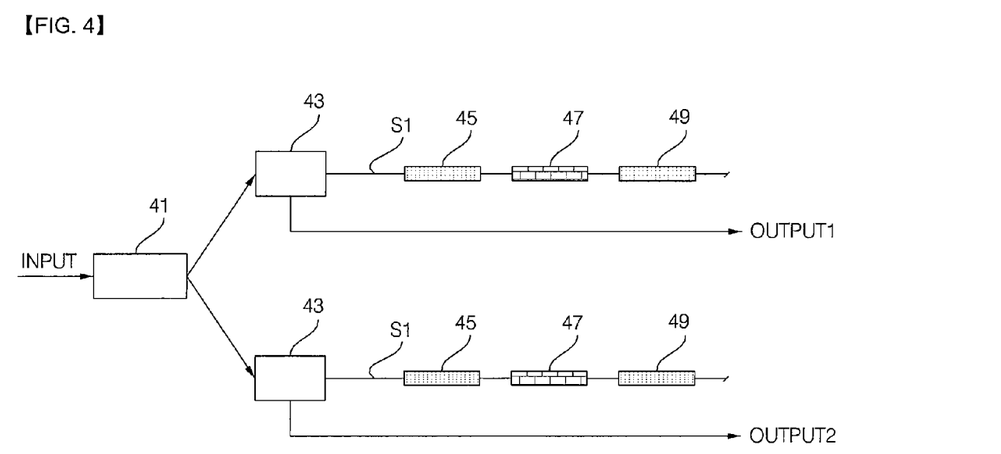
FIG. 4 is a block diagram of an optical DPSK signal demodulator having a phase controllable function that differentially detects an optical DPSK signal using two light receivers according to a fourth embodiment of the invention.

FIG. 4 is a block diagram of an optical DPSK signal demodulator having a phase controllable function that differentially detects an optical DPSK signal using two light receivers according to a fourth embodiment of the invention.

As shown in FIG. 4, the optical DPSK signal demodulator includes a signal divider 41, and two demodulators. Each of the demodulators includes a signal separator 43, two reflectors 45 and 49 having a predetermined reflectivity, a phase control unit 47 that is disposed between the two reflectors 45 and 49, and controls the phase shift between the signals reflected from the two reflectors 45 and 49 to be constant regardless of the change in a center wavelength of the optical signals. The signal separator 43, the two reflectors 45 and 49, and the phase control unit 47 included in each of the demodulators have the same function as the signal separator 21, the two reflectors 23 and 27, and the phase control unit 25 shown in FIG. 2. But, one of the phase control unit 47 shown in FIG. 4 maintains the phase difference between the optical signals reflected from the two reflectors 45 and 49 at 180° regardless of the of the change in a center wavelength of the optical signals, and another demodulator maintains the phase difference between the optical signals at 0°.

The fourth embodiment shown in FIG. 4 is for complementing the third embodiment shown in FIG. 3. According to the fourth embodiment, the signals output from the demodulators function as two intensity modulated signals for a DPSK system using the differential detecting method.

Figure 5:
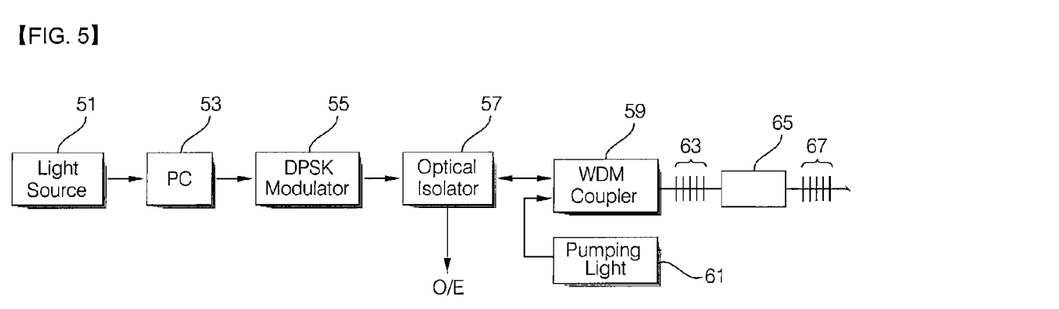
FIG. 5 is a block diagram of an optical DPSK signal demodulator having a phase controllable function according to a fifth embodiment of the invention.

FIG. 5 is a block diagram of an optical DPSK signal demodulator having a phase controllable unit according to a fifth embodiment of the invention.

A light source 51, a polarization control unit 53, and an optical DPSK modulator 55 are components for generating an optical DPSK signal. The light source 51 emits an optical signal to supply to the polarization control unit 53. The polarization control unit 53 maximizes the efficiency while controlling the polarization of the optical signal supplied from the light source 51 to supply to the optical DPSK modulator 55. The DPSK modulator 55 modulates the phase of the optical signal polarized by the polarization control unit 53 to be 180°.

The optical DPSK signal demodulator shown in FIG. 5 includes a signal separator 57, a WDM coupler 59, a pumping light source 61, first and second fiber Bragg gratings 63 and 67 serving as reflectors, a fiber 65 that serves as a phase control unit and is formed of an Yb$^{3+}$ doped optical fiber. In this case, the optical DPSK signal demodulator is used at room temperature without using any compensating circuit.

A light circulator is used as the signal separator 57, and receives a 180° phase shift keyed optical signal to transmit the optical signal to the WDM coupler 59 through an optical path (for example, an optical fiber).

The WDM coupler 59 adds the 180° phase shift keyed optical signal that is supplied from the signal separator 57 through the optical fiber and pumping light emitted from the pumping light source 61 to transmit to the first and second fiber Bragg gratings 63 and 67 serving as reflectors. In this case, the pumping light source 61 emits the pumping light to transmit to the WDM coupler 59.

The first fiber Bragg grating 63 reflects a part of the optical signal supplied from the WDM coupler 59, and the second fiber Bragg grating 67 reflects the rest of the optical signal excluding the part of the optical reflected by the first fiber Bragg grating 63.

The optical signal reflected by the second fiber Bragg grating 67 has a 180° phase difference with respect to the optical signal reflected by the first fiber Bragg grating 63 through a Yb$^{3+}$ doped optical fiber (for example, Yb$^{3+}$ doped 7 mm optical fiber) serving as a phase control unit. When the pumping light source 61 having a wavelength of 980 nm is inserted into the Yb$^{3+}$ doped optical fiber 65, the refractive index of the Yb$^{3+}$ doped optical fiber is changed to change the phase. Therefore, it is possible to compensate the degradation of performance of the system occurred when the phase difference between a means for maintaining the phase difference between the two reflected optical signals at 180° and the demodulator is not 180° due to the change in the center wavelength of the optical signal.

In this case, an experiment was performed under the condition that the interval between the two fiber Bragg gratings 63 and 67 is 10.25 mm, and the delay time is 100 ps. 100 ps correspond to one bit time delay of the optical communication system that uses 10 Gb/s differential phase shift keying. The optical signals having the phase difference of 180° reflected from the two fiber Bragg gratings 63 and 67 are coupled to configure the optical DPSK demodulator for converting the DPSK signal into an intensity modulated signal. The demodulated optical signal is output to be received by the optical receiver using the output of the signal separator 57.

Figure 6:
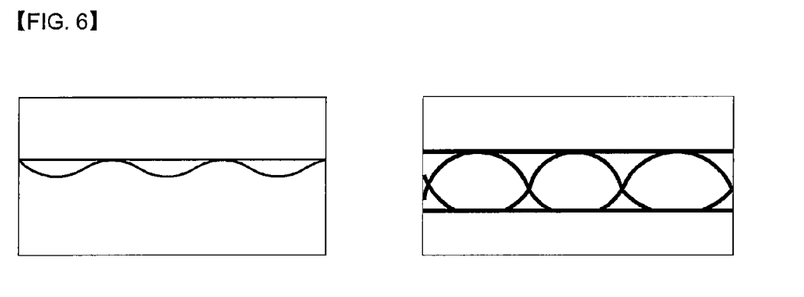
FIG. 6 is an eye diagram of optical DPSK signal and a demodulated optical signal.

FIG. 6 is an eye diagram of optical DPSK signal of FIG. 5 and a demodulated optical signal.

Figure 7:
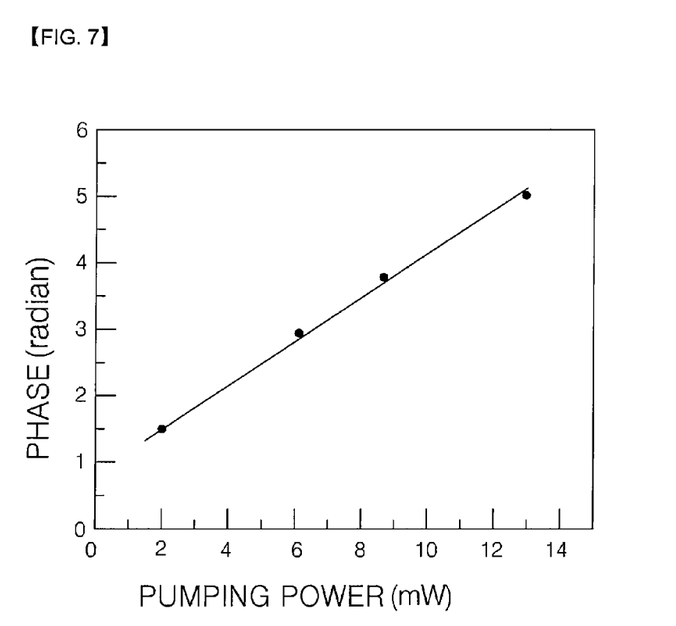
FIG. 7 is a graph illustrating a relationship between the pumping power of a laser diode and the phase shift.

The refractive index of the phase control unit 65 is changed depending on the intensity of the pumping light of the pumping light source 61 shown in FIG. 5 to change the phase of the delayed optical signal. In detail, the amount of phase shift is proportioned to the pumping power of the pumping light source 61, as shown in FIG. 7. The amount of the phase shift is calculated by the following Equation 3.

$$\Delta\Phi = \frac{2\pi}{S} \times \Delta\lambda \qquad (3)$$

In Equation 3, S is an interval of the fringe pattern, and $\Delta\lambda$ is the amount of wavelength shifted depending on the pumping power of the pumping light source 61.

Therefore, it is possible to solve the problems occurred due to the insensitivity to the environment perturbations. Further, the DPSK demodulator according to the embodiments of this invention has an advantage in that the configuration is simple because there is no need to use additional device for compensating the environment perturbations and the manufacturing cost is inexpensive. Furthermore, the optical DPSK system that uses the differential detecting method can be easily embodied by arranging two demodulators in parallel.

As described above, by using reflectors such as FBG, the optical time delay is performed, and the optical DPSK signal is demodulated. However, the time delay and demodulation of the optical DPSK signal using the time delay may be achieved by changing the optical signal that propagates in one mode into an optical signal that propagates in two modes and changes the phase of the signal that propagates in one of two modes.

Figure 8:
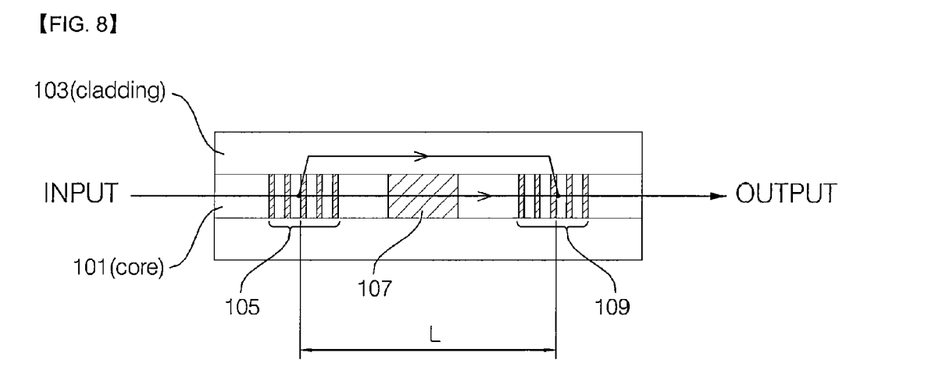
FIG. 8 is a diagram illustrating a configuration of an optical DPSK signal demodulator using a long period fiber grating according to a sixth embodiment of this invention.

FIG. 8 is a diagram illustrating a configuration of an optical DPSK signal demodulator using a long period fiber grating according to a sixth embodiment of this invention.

The optical DPSK signal demodulator using a long period fiber grating includes a first long period grating 105, a second long period grating 109, and a phase shifter 107.

An optical fiber is formed by a core 101 and a cladding 103. The optical signal that propagates in a single mode within the optical fiber by the first long period grating 105 formed in the optical fiber is divided into a cladding mode and a core mode. In this case, since the reflective indices of the core 101 and the cladding 103 are different from each other, the velocity difference between the core mode optical signal and the cladding mode optical signal is occurred. Specifically, since the refractive index of a medium of the core 101 is larger than the refractive index of a medium of the cladding 103, the cladding mode optical signal is faster than the core mode optical signal.

The optical signals divided by the first long period grating 105 are coupled to a single optical signal by the second long period grating 109. The time delay $\Delta t$ of optical signals in two modes is calculated by the following Equation 4, where the interval between the first long period grating 105 and the second long period grating 109 is L, and the differential effective group index between the two modes is $\Delta m_{\it eff}$.

$$\Delta t = \frac{L}{c} \Delta m_{\it eff} \quad (4)$$

Therefore, by controlling the interval between the two long period gratings 105 and 109, it is possible to implement one bit delay.

In the meantime, the phase shifter 107 changes the refractive index of a predetermined part of the optical path between the two long distance gratings 105 and 109. The method of implementing the phase shifter includes a method of irradiating UV light into a fiber when the optical path is embodied by the fiber to change the refractive index of the irradiated part, and a method of adding a material for increasing the refractive index between the two reflectors when the optical path is realized by an optical waveguide. According to the latter method, the nonlinear material is added to the optical path to increase the nonlinearity of the optical path and then change the refractive index of the portion including the nonlinear part. The nonlinear material may be formed of one or a combination of two or more materials of an absorbent such as a rare-earth element ($Yb^{3+}$, $Tm^{3+}$, etc.) or an element that increases the nonlinearity by applying an electric field, such as $LiNbO_3$, etc.

Figure 9:
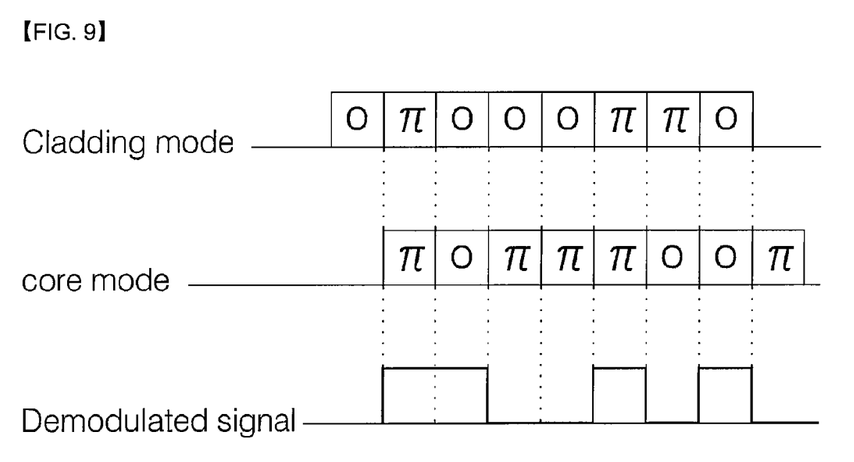
FIG. 9 is a view illustrating an example of optical signal that is transmitted and modulated in two modes in the optical DPSK signal demodulator of FIG. 8.

FIG. 9 is a view illustrating an example of optical signal that is transmitted and modulated in two modes in the optical DPSK signal demodulator of FIG. 8.

As shown in FIG. 9, the core mode optical signal is one bit delayed from the cladding mode optical signal. The phase of the core mode optical signal is changed to 0° or 180°. Therefore, the both signals are composed to output the intensity modulated optical signal.

In the optical DPSK demodulator using the long period gratings, since two mode optical signals propagate through a single optical path, the signals are equally affected by the external perturbations to be insensitive to the external perturbations. Further, it is possible to implement minute time delay line of several hundred pemto seconds, and to avoid the error to be occurred during manufacturing the delay line.

It will be apparent to those skilled in the art that various modifications and changes may be made without departing from the scope and spirit of the present invention. Therefore, it should be understood that the above embodiments are not limitative, but illustrative in all embodiments. The scope of the present invention is defined by the appended claims rather than by the description preceding them, and therefore all changes and modifications that fall within metes and bounds of the claims, or equivalents of such metes and bounds are therefore intended to be embraced by the claims.

What is claimed is:

1. An optical DPSK signal demodulator, comprising:
    a signal divider configured to divide a main optical signal into first and second optical signals;
    a first optical unit including:
        a first signal separator configured to receive the first optical signals and direct the first optical signals to a first optical path;
        a first reflector provided along the first optical path and proximate to the first signal separator, the first reflector being configured to receive the first optical signals and reflect the first optical signals toward the first signal separator, and
        a second reflector provided along the first optical path and distal to the first signal separator, the second reflector being configured to receive the first optical signals and reflect the first optical signals toward the first signal separator,
        a phase shifter provided along the first optical path and between the first and second reflectors, the phase shifter being configured to allow the first optical signals reflected from the first and second reflectors to have a phase difference, and
        a first output terminal configured to receive the first optical signals reflected by the first and second reflectors and output the first optical signals; and
    a second optical unit including:
        a second signal separator configured to receive the second optical signals and direct the second optical signals to a second optical path;
        a third reflector provided along the second optical path and proximate to the second signal separator, the third reflector being configured to receive the second optical signals and reflect the second optical signals toward the second signal separator, and
        a fourth reflector provided along the second optical path and distal to the second signal separator, the fourth reflector being configured to receive the second optical signals and reflect the second optical signals toward the second signal separator, and
        a second output terminal configured to receive the second optical signals reflected by the third and fourth reflectors and output the second optical signals,
        wherein the second optical signals reflected by the third and fourth reflectors and received by the second output terminal do not have a substantial phase difference.

2. The optical DPSK signal demodulator of claim 1, wherein the first and second reflectors are formed by a Bragg grating, a thin film coating, a reflectively coated dielectric, or a combination thereof.

3. The optical DPSK signal demodulator of claim 1, wherein the first and second reflectors satisfy the following relationship to reflect the optical signals to have substantially the same intensity $$R_1 = R_2 \times (1-R_1)^2$$

where $R_1$ is a reflectivity of the first reflector, and $R_2$ is a reflectivity of the second reflector.

4. The optical DPSK demodulator of claim I, wherein the first optical signal reflected from the second reflector is delayed by $\Delta t$ which is calculated by the following equation:

$$\Delta t = 2 \times \frac{(n_1 \times L_1 \times n_2 \times L_2)}{c}$$

where $n_1$ and $L_1$ are a refractive index and a total length of a single reflector, $n_2$ and $L_2$ are a refractive index and a length of the first optical path formed between the first and second reflectors, and c is a velocity of light in vacuum.

5. The optical DPSK signal demodulator of claim 1, wherein the phase shifter is implemented by changing the refractive index of a predetermined portion of the first optical path between the first and the second reflectors.

6. The optical DPSK signal demodulator of claim 1, wherein the phase shifter changes the refractive index by at least one of methods selected from the group consisting of irradiating UV light, pressuring, and adding a material for changing the refractive index.

7. An optical DPSK signal demodulator, comprising:
a signal divider configured to divide a main optical signal into first and second optical signals;
a first optical unit including:
a first signal separator configured to receive the first optical signals and direct the first optical signals to a first optical path;
a first reflector provided along the first optical path and proximate to the first signal separator, the first reflector being configured to receive the first optical signals and reflect the first optical signals toward the first signal separator, and
a second reflector provided along the first optical path and distal to the first signal separator, the second reflector being configured to receive the first optical signals and reflect the first optical signals toward the first signal separator,
a first phase controller provided along the first optical path and between the first and second reflectors, the first phase controller being configured to control a phase shift between the first optical signals reflected from the first and second reflectors to have a first phase difference, and
a first output terminal configured to receive the first optical signals reflected by the first and second reflectors and output the first optical signals; and
a second optical unit including:
a second signal separator configured to receive the second optical signals and direct the second optical signals to a second optical path;
a third reflector provided along the second optical path and proximate to the second signal separator, the third reflector being configured to receive the second optical signals and reflect the second optical signals toward the second signal separator, and
a fourth reflector provided along the second optical path and distal to the second signal separator, the fourth reflector being configured to receive the second optical signals and reflect the second optical signals toward the second signal separator,
a second phase controller provided along the second optical path and between the third and fourth reflectors, the second phase controller being configured to control a phase shift between the second optical signals reflected from the third and fourth reflectors to have a second phase difference that is different from the first phase difference, and
a second output terminal configured to receive the second optical signals reflected by the third and fourth reflectors and output the second optical signals.

8. The optical DPSK signal demodulator of claim 7, wherein the first and second reflectors are formed by a Bragg grating, a thin film coating, a reflectively coated dielectric, or a combination thereof.

9. The optical DPSK signal demodulator of claim 7, wherein the first phase controller increases a heat or nonlinearity of the phase of the optical signal time delayed by the second reflector to change the refractive index.

10. The optical DPSK signal demodulator of claim 7, wherein the first phase controller is formed of an optical fiber to which a nonlinear material is added, or an optical waveguide to which a nonlinear material is added.

11. The optical DPSK signal demodulator of claim 7, wherein the first phase controller is formed of a nichrome wire or a thermal electric cooler (TEC) that changes the refractive index using heat.

12. The optical DPSK signal demodulator of claim 7, wherein the first and second phase differences are 0° and 180°, respectively.

13. The optical DPSK signal demodulator of claim 12, wherein the first phase controller is formed of an optical fiber to which a nonlinear material is added, or an optical waveguide to which a nonlinear material is added.

14. The optical DPSK signal demodulator of claim 12, wherein the first phase controller is formed of a nichrome wire or a TEC that changes the refractive index using heat.

15. A method of demodulating an optical DPSK signal, comprising:
dividing an main optical signal into a first optical signal and a second optical signal, the first optical signal being directed to a first optical path, the second optical signal being directed to a second optical path;
reflecting a first portion of the first optical signal using a first reflector provided along the first optical path;
reflecting a second portion of the first optical signal using a second reflector provided along the first optical path;
shifting a phase of the second portion of the first optical signal reflected by the second reflector to have a first phase difference with the first portion of the first optical signal reflected by the first reflector;
coupling the reflected first portion of the first optical signal and the second portion of reflected first optical signal to output the first coupled optical signals;
reflecting a first portion of the second optical signal using a third reflector provided along the second optical path;

reflecting a second portion of the second optical signal using the fourth reflector provided along the first optical path; and coupling the reflected first portion of the second optical signal and the second portion of the reflected second optical signal to output the second coupled optical signals.

16. The method of claim 15, wherein the shifting of the phase includes compensating a phase shift of a demodulator due to the change in the center wavelength of the optical signal to maintain the first phase difference between the reflected first portion of the first optical signal and the reflected second portion of the first optical signal at 0° or 180°.

17. The method of claim 15, further comprising:
shifting a phase of the second portion of the second optical signal reflected by the fourth reflector to have a second phase difference with the first portion of the second optical signal reflected by the third reflector.

18. The method of claim 15, wherein the first and second phase difference are different from each other.

19. The method of claim 18, wherein the first and second phase difference are 0° or 180°, respectively.

20. The method of claim 15, wherein the phase shifting is performed using a phase control unit provided between the first and second reflectors and changes the phase by changing a refractive index.

* * * * *